May 10, 1960
A. I. McFARLAN
2,935,857
AIR CONDITIONING
Filed Feb. 19, 1957
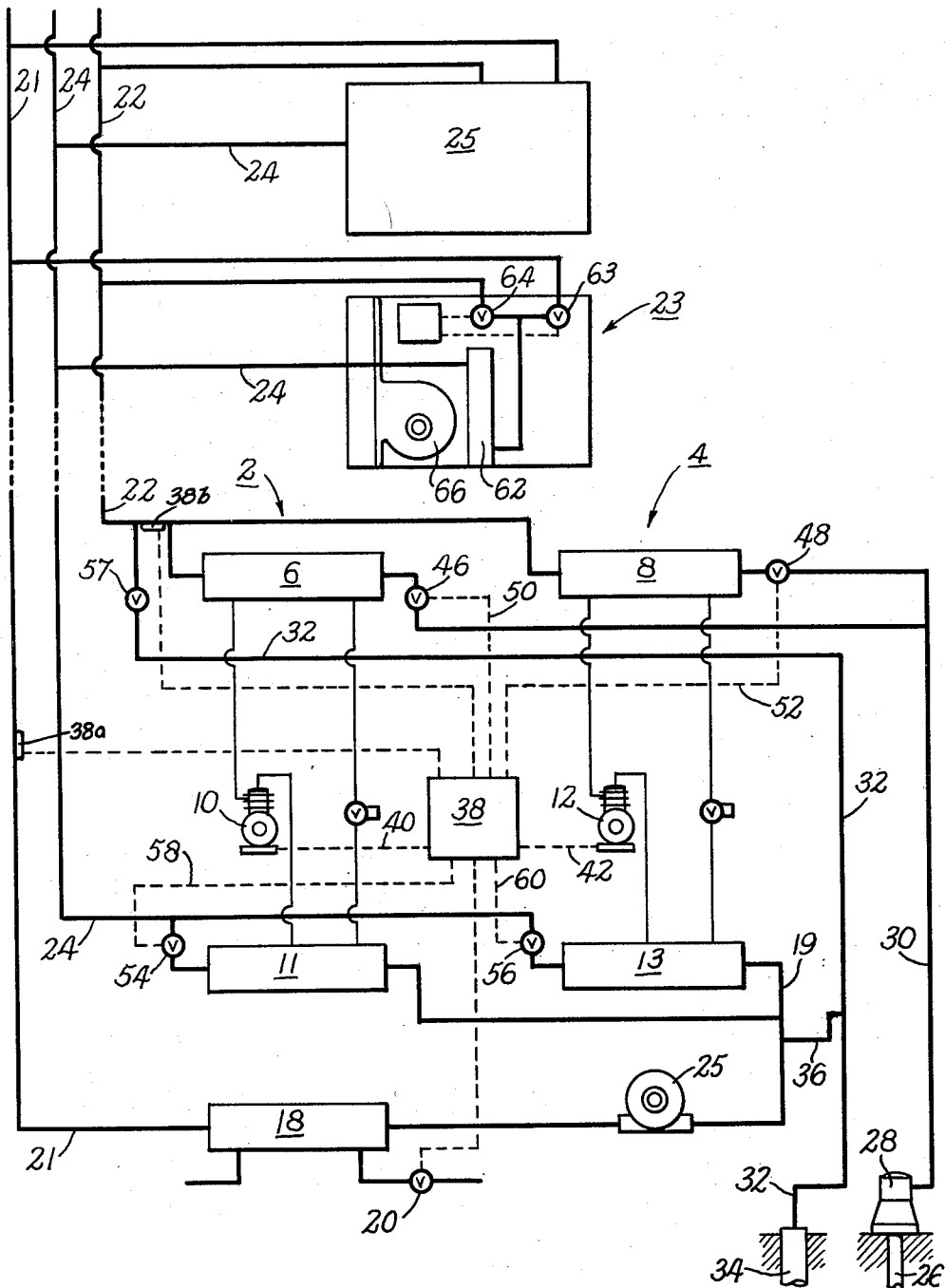
INVENTOR
Alden I. McFarlan
BY
Curtis, Morris + Safford
ATTORNEYS

United States Patent Office 2,935,857
Patented May 10, 1960

2,935,857

AIR CONDITIONING

Alden I. McFarlan, Westfield, N.J.

Application February 19, 1957, Serial No. 641,201

5 Claims. (Cl. 62—159)

The invention relates to air conditioning, and more in particular, to a heating and cooling system for a multiple zone building or group of buildings.

An object of this invention is to provide an improved heating and cooling system. Another object is to provide a refrigeration system which is adapted to extract heat from one zone and to deliver heat to another, and which includes auxiliaries for dissipating excess heat from the system and for adding heat to the system when the supply within the system is insufficient. A further object is to provide for improved control for the heating and cooling operations of systems of the nature referred to above. Another object is to provide a system of the above nature which is adapted to operate as a heat pump to heat one zone by utilizing heat from an external source such as well water or outside air, and which also cools one or more zones utilizing the external source as a "heat sink" when the heat derived from cooling exceeds that required for heating. A further object is to provide systems of the above nature which are inexpensive to manufacture and maintain, efficient in operation, and which occupy minimum space.

These and other objects will be in part obvious and in part pointed out below.

In the drawing, the single figure is a somewhat schematic representation of a system constituting one embodiment of the invention.

In the illustrative embodiment of the invention, the system includes arrangements for heating and cooling the air in a plurality of zones, in this case, the different floors of a building. The heating and cooling are performed by supplying separate streams of hot and cold water to the various zones, and automatic means is provided to selectively deliver hot water or cold water to each zone in the quantity necessary to perform the desired heating or cooling function.

In this embodiment of the invention, the system includes two separate refrigeration systems or stages 2 and 4, having direct-expansion evaporator-chillers 6 and 8, compressors 10 and 12 and condensers 11 and 13, respectively. The water circuits of the condensers are in parallel and their outlet is connected through a condenser discharge line 19, and thence through a pump 25 to the hot water line 21. Downstream in this line 21 there is a water heating unit or converter 18 which may receive steam through a line having a control valve 20, thus to further heat the water flowing in line 21 after the water has passed through condensers 11 and 13 for the initial heating.

The water circuits of the evaporator-chillers 6 and 8 are connected in parallel and the water flows from them through a chilled or cold water line 22. This cold water line 22 and the hot water line 21 are heat insulated and they extend together to the various zones of the conditioned space. Within each of these zones there is a unit 23 for heating or cooling a stream of air, and a controlled amount of hot or cold water flows through each of the coils of these units, and the water from all of the coils returns from these zones through a return water line 24. The water from line 24 flows to the condensers 11 and 13. Water is supplied to the water circuits of the chillers from a well 26 by a pump 28 through a water supply line 30. The cold water line 22 is connected by a line 32 to a dispersion well 34, and the hot water line 21 is also connected to this dispersion well by a line 36.

The entire system is operated by a controller 38 which has manually adjustable means for regulating the operation. The controller 38 starts and stops the refrigeration systems 2 and 4 through the control lines 40 and 42. At the inlet of the chillers 6 and 8 are water valves 46 and 48, respectively, which are also opened and closed by a controller through lines 50 and 52. At the inlet to the condensers, there are similar water valves 54 and 56 which are controlled through lines 58 and 60.

Unit 23 comprises a coil 62 which may be a pressure relief valve to discharge chilled water to the diffusion well 34 when no cooling is required or one which receives a carefully controlled quantity of either hot water through a valve 63 or cold water through a valve 64, and a fan 66 draws the air through the coil to the conditioned space. Additional units of the system similar to unit 23 are represented by the unit 25. Each of them is operated independently of the others to provide the desired temperature of air within the space. Certain of the details of construction of these units and the operation thereof to maintain a desired temperature and humidity conditions are explained and discussed in my co-pending application, Serial No. 536,513, filed September 26, 1955, and the appropriate portions of that application are incorporated herein, now Patent 2,796,740, issued June 25, 1957, and reference may be made hereto. However, it should be noted that, in the illustrative embodiment of the present invention, the control and operation are such that a suitable quantity of either hot or cold water is supplied to each of the units 23 and 25, and that hot and cold water are not supplied simultaneously to any one coil.

The water is returned from the coils 62 of all of these units through the common return line 24, and it flows through the condensers 11 and 13 to line 19. Pump 25 maintains a predetermined water pressure within the hot water line 21 extending to the various units 23 and 25, and the pump draws a sufficient quantity of the return water from line 19 to maintain this pressure. However, the excess amount of return water passes from line 19 through lines 36 and 32 to the dispersion well 34. The cold water line 22 is also connected to the dispersion well through the line 32, but the flow of the cold water is prevented except when valve 57 is opened. Valve 57 opens in response to a rise in the pressure in line 22 and permits a sufficient quantity of water to flow through line 32 to maintain the desired pressure in the cold water line.

During operation, when both heating and cooling are required, water is drawn from the well, pumped through the chillers and thence is distributed through the cold water line 22. Simultaneously, hot water is supplied through line 21, and all of the water is returned from the coils through line 24. The stream of returned water which is not required to satisfy the requirements for hot water in line 21 is returned to the dispersion well from line 19 and thence through lines 36 and 32. As the flow of water in the cold water line 22 is increased, the percentage of the returned water flowing to the dispersion well is decreased. The vertical rise in line 36 maintains a predetermined head pressure in line 19, and insures that water is available to supply the demands of pump 25.

When the major load is that of heating, the valve 57 is partially opened so that some or most of the cold water is diverted from the cold water line 22 to the dispersion well. Hence, the major portion of the returned water flows from the condensers and line 19 to pump 25 and line 21, and there is a greatly reduced flow of water through line 36.

Under some conditions of operation, only one of the refrigeration systems 2 or 4 is operating, in which case it is desirable to shut off the flow of water through the chiller and the condenser of the refrigeration system which is not operating. Hence, if system 4 is not operating, then controller 38 closes valve 48 to stop the flow of water through chiller 8, and it closes valve 56 to stop the flow of water through condenser 13; and, valves 46 and 54 are closed when system 2 is not operating. Steam is supplied to the converter 18 under the control of controller 38 whenever the hot water valve 63 of any of the units 23 or 25 is fully opened and the demand of that unit for heat is still not satisfactory.

The controller 38 is provided with a thermostat, having elements 38a and 38b responsive to the temperature of the hot and cold water lines 21 and 22, respectively. Hence, water is diverted from the cold water line to the dispersion well when the cold water line pressure tends to rise. In summer the supply air temperature is regulated sufficiently low to assure a correct dew point, and in winter to assure a sufficiently warm temperature to produce the room temperature desired. In winter the control can also be from the room temperature directly.

The well water flowing through both chillers is available for maximum cooling when that is required, but the cold water which is not required is returned directly to the diffusion well. The common return line for the water from the coils leads through the condensers so that all of the water is subjected to condenser heating. The parallel arrangement of the chillers and condensers permits operation with minimum flow when the loads are light. The automatic splitting of the streams between the hot and cold water lines and the diffuser well gives maximum efficiency and a great flexibility of operation.

With the system herein disclosed, it is possible to simultaneously heat and cool without supplying steam for a very substantial portion of the time in moderate climates. This is particularly true where some zones are internal or have a high rate of heat production. The well water is available at all times to provide heat when required up to the capacity of the system as a heat pump, above which the additional heat is supplied through the converter.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in the limiting sense.

I claim:

1. In an air conditioning system which is adapted to provide heating and cooling for a plurality of zones which normally constitute different heating and cooling loads, the combination of, a plurality of air treating units which are adapted to provide air to the respective zones, each of said units including a heat transfer coil through which air is passed to provide the heating or cooling of the air in accordance with the demand of that zone and means to direct air through said coil, refrigeration means including an evaporator for cooling water and a condenser, a circuit for water including means constituting a water supply well and water receiving means, means to pass a stream of water from said well through a cooling zone to be cooled by said evaporator and thence through a cold water distribution line to each of said units, means to pass water returning from each of said units through said condenser and thence through a hot water line to each of said units, and means to divert water from said hot water line and from said cold water line to said water receiving means, whereby constant supplies of hot and cold water are available to each of said coils.

2. A system as described in claim 1 wherein said refrigeration means comprises a plurality of refrigeration systems each of which includes an evaporator-chiller and a condenser, said circuit for water including branch means connecting said evaporator-chillers in parallel, and said circuit for water including branch means connecting said condensers in parallel, and control means for controlling the flow of water through said evaporator-chiller and said condenser of each of said refrigeration systems.

3. A system as described in claim 2 wherein said control means includes valve means to prevent the flow of water through one of said evaporator-chillers when its refrigeration system is not operating.

4. A system as described in claim 2 wherein said control means includes valve means to prevent the flow of water through one of said condensers when its refrigeration system is not operating.

5. In an air conditioning system which is adapted to provide heating and cooling for a plurality of zones which normally constitute different heating and cooling loads, the combination of, a plurality of air treating units each of which is adapted to receive water and to subject air to a heat transfer relationship therewith, refrigeration means which is adapted to cool one stream of water and to heat another stream of water simultaneously, means to pass a stream of water to be cooled by said refrigeration system and thence through a cold water line to said units, means to pass a stream of water which has been heated by said refrigeration system and thence through a hot water line to said units, means to direct the water from all of said units through a return line to be heated by said refrigeration system, means constituting a pool for water from which the stream of water to be cooled is withdrawn and to which excess water is delivered from said cold water line and from said hot water line, and means in each of said cold water and hot water lines operable in response to a condition affected by the flow therein for controlling the delivery of excess water therefrom to the pool.

References Cited in the file of this patent
UNITED STATES PATENTS

| | | |
|---|---|---|
| 2,461,449 | Smith | Feb. 8, 1949 |
| 2,780,415 | Gay | Feb. 5, 1957 |
| 2,796,740 | McFarlan | June 25, 1957 |